United States Patent

Sodergren et al.

Patent Number: 5,297,187
Date of Patent: Mar. 22, 1994

[54] PRESSURE VESSEL PENETRATION SEALING DEVICE

[75] Inventors: Jan H. Sodergren, Harrison; Harry K. Williams, Signal Mountain, both of Tenn.

[73] Assignee: Combustion Engineering, Inc., Windsor, Conn.

[21] Appl. No.: 996,365

[22] Filed: Dec. 23, 1992

Related U.S. Application Data

[63] Continuation of Ser. No. 671,279, Mar. 18, 1991, abandoned.

[51] Int. Cl.⁵ ............................................. G21C 13/067
[52] U.S. Cl. .................................. 376/203; 376/463; 138/89; 138/91; 165/76
[58] Field of Search ............... 376/203, 204, 205, 206, 376/463; 165/76; 138/89, 91, 98

[56] References Cited

U.S. PATENT DOCUMENTS

| | | | |
|---|---|---|---|
| 577,811 | 2/1897 | Tadder | 138/89 |
| 1,092,540 | 4/1914 | Robinson | 138/89 |
| 2,053,918 | 9/1936 | Peretzman | 138/98 |
| 2,856,963 | 10/1958 | Hoerter | 138/89 |
| 3,156,373 | 11/1964 | Willis | 220/24.5 |
| 3,353,566 | 11/1967 | Cepkauskas et al. | 138/89 |
| 3,451,583 | 6/1969 | Lee, II | 220/24.5 |
| 3,691,609 | 9/1972 | Ice, Jr. et al. | 29/252 |
| 4,113,006 | 9/1978 | Clapp | 165/76 |
| 4,114,654 | 9/1978 | Richardson | 138/89 |
| 4,195,869 | 4/1980 | Klahn et al. | 292/256.67 |
| 4,513,786 | 0/1985 | Sodergren et al. | 138/89 |
| 4,646,816 | 3/1987 | Rothstein | 165/76 |
| 4,738,023 | 4/1988 | Fabris | 29/723 |
| 4,986,313 | 1/1991 | Mounet | 138/89 |

FOREIGN PATENT DOCUMENTS

| 61-80089 | 4/1986 | Japan | 376/463 |
| 1080089 | 4/1986 | Japan | 376/463 |

Primary Examiner—Donald P. Walsh
Assistant Examiner—Chrisman D. Carroll
Attorney, Agent, or Firm—John H. Mulholland

[57] ABSTRACT

A device for sealing a penetration in a pressurizer of a nuclear steam supply system includes a hollow cylinder adapted to be inserted into the heater sleeve, in place of the heater. The cylinder includes a nose portion formed with a number of axially extending slots defining therein a number of radially displaceable segments, each of which has an outwardly extending flange, proximate its distal end, which is engageable with the heater sleeve to resist blowout. A rod, inserted into the cylinder, seals the passage therethrough while locking the displaceable nose portion segments in their sleeve-engaging position. An annular soft nickel band on the outside of the cylinder engages the inner surface of the heater sleeve to provide an effective seal therebetween.

4 Claims, 2 Drawing Sheets

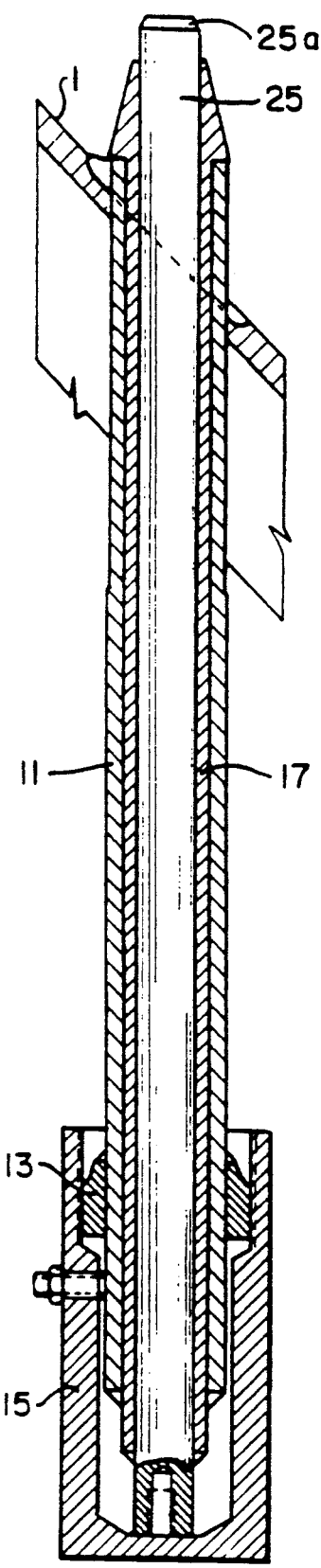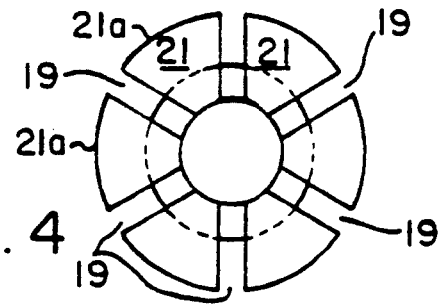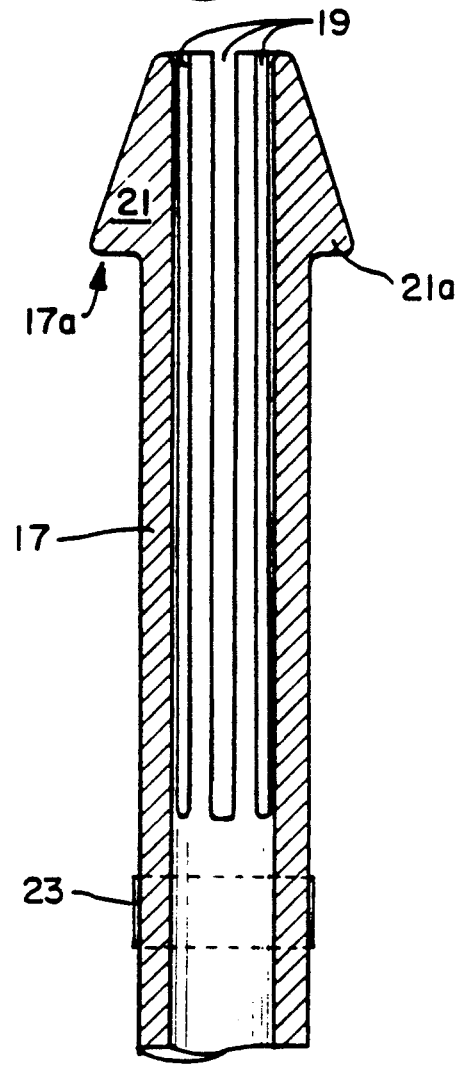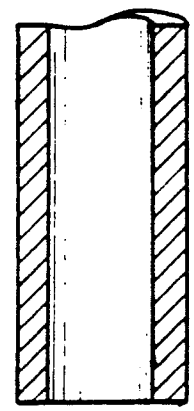
Fig. 2
Fig. 4
Fig. 3

PRESSURE VESSEL PENETRATION SEALING DEVICE

This is a continuation of copending application Ser. No. 07/671,279 filed Mar. 18, 1991, now abandoned.

BACKGROUND AND SUMMARY OF THE INVENTION

The present invention pertains to nuclear steam supply systems (NSSS) and, more particularly, to a device for sealing a penetration in a pressurizer for such a system.

In a nuclear steam supply system, the pressurizer maintains reactor coolant system operating pressure and, in conjunction with the chemical and volume control system, compensates for changes in reactor coolant volume during load changes, heatup, and cooldown. During full-power operation, the pressurizer is about one-half full of saturated steam. Reactor coolant system pressure may be controlled automatically or manually by maintaining the temperature of the pressurizer fluid at the saturation temperature corresponding to the desired system pressure.

Typically, the pressurizer is a cylindrical pressure vessel, vertically mounted and bottom supported. A small continuous spray flow is maintained in the pressurizer to avoid stratification of the pressurizer boron concentration and to maintain the temperature in the surge and spray lines. Energy is supplied to the water by replaceable, direct-immersion, electric heaters which are inserted from the bottom head of the pressurizer. A number of the heaters are connected to proportional controllers which adjust the heat input to account for steady-state losses and to maintain the desired steam pressure in the pressurizer.

The individual heaters are carried in tubular heater sleeves which are sealingly attached to the pressurizer pressure vessel. In the event that a leak develops in one of the heater sleeves, means must be available to quickly and effectively seal the leak, to prevent the escape of radioactive water, while the system remains in operation.

It is, therefore, a primary object of the present invention to provide a device for sealing a penetration in a pressurizer for a nuclear steam supply system and, more particularly, a leak associated with a pressurizer heater sleeve.

It is a further object to provide such a sealing device which may be quickly and effectively utilized to seal such a leak while the system remains in operation.

These and other objects and advantages of the invention as may hereinafter appear are achieved by a sealing device including a hollow cylinder adapted to be inserted into the tubular heater sleeve, in place of the heater. The cylinder includes a nose portion formed with a plurality of axially extending slots defining therein a number of radially displaceable segments, each of which has an outwardly extending flange, proximate its distal end, which is engageable with the heater sleeve to resist blowout. A rod, inserted into the cylinder, seals the passage therethrough while locking the displaceable nose portion segments in their sleeve-engaging position.

Advantageously, the cylinder is formed of a nickel alloy and includes an annular band of soft nickel on its external surface which engages the inner surface of the heater sleeve to provide an effective seal therebetween.

BRIEF DESCRIPTION OF THE DRAWINGS

FIG. 2 is a cross-sectional view of a sealing device in accord with the present invention installed in the pressurizer of FIG. 1;

FIG. 3 is a cross-sectional view of the sealing device cylinder; and

FIG. 4 is a top end view of the cylinder of FIG. 3.

DESCRIPTION OF THE PREFERRED EMBODIMENT

Figure 1:
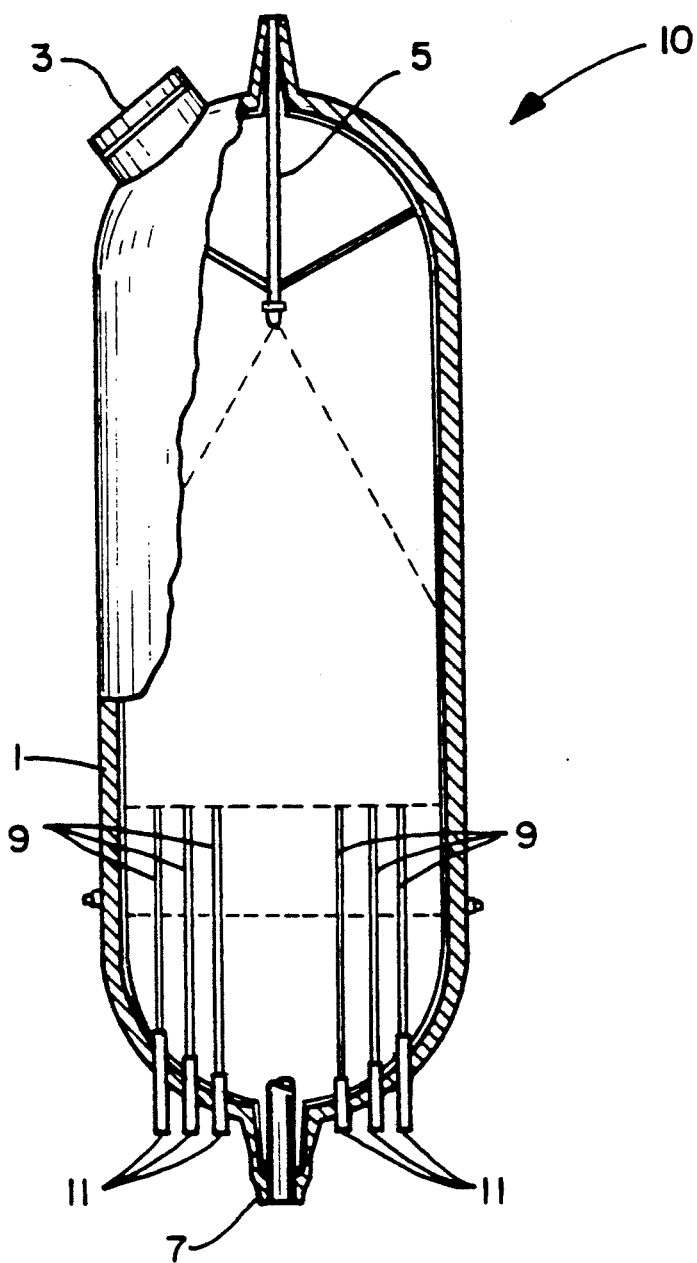
FIG. 1 is a side elevational view, partly in cross-section, of a pressurizer for a nuclear steam supply system.

Turning now to the drawings, there is shown in FIG. 1 a pressurizer 10 for a nuclear steam supply system comprising a carbon steel pressure vessel 1 having, at its upper end, a manway 3 and a spray system 5. A surge outlet 7 and a plurality of electric immersion heaters 9 are disposed at the lower end of pressure vessel 1.

Immersion heaters 9 are supported within tubular nickel alloy heater sleeves 11 which penetrate pressure vessel 1 and are sealed thereto. An annular bushing 13 is welded to the outside of each heater sleeve 11 and threadedly engages a locking collar 15 which serves to retain the associated heater 9 against the internal pressure of pressurizer 10.

The sealing device of the present invention includes a hollow carbon steel cylinder 17 best seen in FIG. 3. Cylinder 17 has an external diameter substantially equal to the internal diameter of heater sleeves 11 and a length exceeding the length thereof. A tapered nose portion 17a of cylinder 17 is divided, by axially extending slots 19, into a number of radially displaceable segments 21 each of which includes an outwardly extending flange 21a proximate its distal end. An annular band 23 of a soft nickel alloy is formed on the external surface of cylinder 17.

In the event that a leak develops in one of heaters 9 or heater sleeves 11, the affected heater 9 is removed and replaced with a cylinder 17. It will be appreciated that, as cylinder 17 is inserted into heater sleeve 11, engagement between the inner surface of heater sleeve 11 and tapered nose portion 17a of cylinder 17 results in a radially inward displacement of segments 21 such that nose portion 17a is enabled to pass therethrough. As nose portion 17a emerges from heater sleeve 11 into the interior of pressure vessel 1, segments 21 reassume their unstressed positions whereat outwardly extending flanges 21a engage heater sleeve 11 as seen in FIG. 2. This engagement restrains cylinder 17 against ejection by the steam pressure within pressure vessel 1.

With cylinder 17 in position, a solid, nickel alloy, cylindrical rod 25 is inserted into the interior thereof. Rod 25 has a smooth diameter substantially equal to the internal diameter of cylinder 17 and a length exceeding the length thereof. A slightly tapered nose portion 25a is provided to facilitate insertion into cylinder 17. Rod 25 serves to seal the passage through cylinder 17 and to lock segments 21 into their sleeve-engaging position. It will, further, be appreciated that rod 25 urges cylinder 17 against heater sleeve 11 to provide an interference seal therebetween. In particular, soft nickel band 23 is compressed between heater sleeve 11 and cylinder 17 to comprise a further seal therebetween. Advantageously, band 23 is disposed at the point where cylinder 17 passes through pressure vessel 1, whereby the pressure vessel wall provides additional stiffening and support to heater sleeve 11.

Before replacement of locking collar 15, which is removed to provide access to heater 9, cylinder 17 is welded to heater sleeve 11 and rod 25 is welded to cylinder 17.

It is to be noted that the present sealing device will resist being ejected and will maintain an effective seal even in the event of a full circumferential failure of the portion of the heater sleeve 11 external to the pressure vessel 1.

What is claimed is:

1. A device for sealing a penetration in a pressurizer of a nuclear steam supply system, said penetration including a tubular heater sleeve projecting from the pressurizer and providing passage thereinto, said device comprising a hollow cylinder disposable within said heater sleeve and a substantially cylindrical smooth rod disposable within said cylinder, said cylinder having an external diameter substantially equal to the internal diameter of said heater sleeve and a length exceeding the length thereof, said cylinder including a nose portion formed with a plurality of axially extending slots defining therein a plurality of radially displaceable segments, each of said segments having an outwardly extending flange proximate its distal end engageable with said heater sleeve, said rod having a diameter substantially equal to the internal diameter of said cylinder and being operable to prevent radial displacement of said segments and to urge said cylinder against said heater sleeve to provide an interference seal therebetween.

2. The device of claim 1, wherein said cylinder is formed of a nickel alloy and includes an annular band of soft nickel on its external surface, said band being engageable with the inner surface of said heater sleeve to provide said interference seal between said heater sleeve and said cylinder.

3. The device of claim 1, wherein said cylinder is welded to said heater sleeve and said rod is welded to said cylinder.

4. The device of claim 1, wherein said cylinder nose portion is tapered so as to facilitate insertion of said cylinder into said heater sleeve.

* * * * *